(12) United States Patent
Okazaki et al.

(10) Patent No.: US 12,531,293 B2
(45) Date of Patent: Jan. 20, 2026

(54) POWER SUPPLY

(71) Applicant: KUBOTA CORPORATION, Osaka (JP)

(72) Inventors: Kazuto Okazaki, Osaka (JP); Daiki Tamba, Osaka (JP)

(73) Assignee: KUBOTA CORPORATION, Osaka (JP)

( * ) Notice: Subject to any disclaimer, the term of this patent is extended or adjusted under 35 U.S.C. 154(b) by 824 days.

(21) Appl. No.: 17/834,419

(22) Filed: Jun. 7, 2022

(65) Prior Publication Data

US 2023/0006283 A1 Jan. 5, 2023

(30) Foreign Application Priority Data

Jul. 2, 2021 (JP) ................................. 2021-110823
May 20, 2022 (JP) ................................. 2022-083047

(51) Int. Cl.
*H01M 10/6563* (2014.01)
*H01M 10/613* (2014.01)
*H01M 10/652* (2014.01)
*H01M 10/6566* (2014.01)
*H05K 7/20* (2006.01)

(52) U.S. Cl.
CPC ..... *H01M 10/6563* (2015.04); *H01M 10/613* (2015.04); *H01M 10/652* (2015.04); *H01M 10/6566* (2015.04); *H05K 7/20409* (2013.01); *H05K 7/20909* (2013.01)

(58) Field of Classification Search
None
See application file for complete search history.

(56) References Cited

U.S. PATENT DOCUMENTS

| | | | |
|---|---|---|---|
| 2008/0233475 A1* | 9/2008 | Kozu ................ | H01M 10/6566 429/159 |
| 2011/0194253 A1* | 8/2011 | Momose ............... | H01L 23/467 361/697 |
| 2015/0037632 A1* | 2/2015 | Yamamoto .......... | H01M 50/227 429/82 |
| 2018/0226702 A1* | 8/2018 | Inoue ..................... | B60L 50/64 |

FOREIGN PATENT DOCUMENTS

| | | |
|---|---|---|
| EP | 1 897 739 A1 | 3/2008 |
| EP | 3 361 552 A1 | 8/2018 |
| EP | 3 782 835 A1 | 1/2021 |
| JP | 5892119 B2 | 3/2016 |
| JP | 2016-123165 A | 7/2016 |
| JP | 2016-141322 A | 8/2016 |
| JP | 2016-172507 A | 9/2016 |

(Continued)

OTHER PUBLICATIONS

European Search Report Issued Apr. 24, 2023 in EPO application No. 22177969.7.

(Continued)

*Primary Examiner* — Alix E Eggerding
(74) *Attorney, Agent, or Firm* — Greenblum & Bernstein, P.L.C.

(57) ABSTRACT

A power supply includes a battery; an inverter that controls an output voltage of the battery; an air-cooler that cools the battery and the inverter with cooling air; and a case that houses the battery, the inverter, and the air-cooler.

11 Claims, 7 Drawing Sheets

(56) References Cited

FOREIGN PATENT DOCUMENTS

| JP | 2018-030450 A | 3/2018 |
| JP | 2018-032585 A | 3/2018 |

OTHER PUBLICATIONS

Office Action issued Feb. 7, 2023 in Indian family member application No. 202244032508.
Office Action dated Mar. 18, 2025 in Japanese family member application No. 2022-083047, with English language translation thereof.

* cited by examiner

POWER SUPPLY

CROSS REFERENCE TO RELATED APPLICATIONS

This application claims the benefit of priority to Japanese Patent Application No. 2021-110823 filed on Jul. 2, 2021 and to Japanese Patent Application No. 2022-083047 filed on May 20, 2022. The entire contents of this application are hereby incorporated herein by reference.

BACKGROUND OF THE INVENTION

1. Field of the Invention

The present invention relates to a power supply that is mounted on, for example, an industrial machine such as a working vehicle.

2. Description of the Related Art

Conventionally, a power supply disclosed in Japanese Unexamined Patent Application Publication No. 2016-172507 is known.

The power supply disclosed in Japanese Unexamined Patent Application Publication No. 2016-172507 includes a battery box that houses a battery, an inverter that controls an output voltage of the battery, a cooler that cools the battery and the inverter, and so forth. The cooler includes a battery fan for cooling the battery and a water pump for cooling the inverter and so forth.

SUMMARY OF THE INVENTION

In the power supply described above, the battery and the inverter are cooled by the separate coolers (the battery fan and the water pump) independent of each other. Hence, the power supply requires a case having a large internal space to house the coolers. Thus, it is difficult to reduce the size of this power supply, and a large space is required for installation. Moreover, since the number of components increases, there is also a problem that manufacturing cost increases.

The present invention has been made in view of the above-described problems, and provides a power supply that can efficiently cool a battery and an inverter, can be reduced in size, and can be reduced in manufacturing cost.

Technical measures taken by the present invention to address the above-described problems are characterized in the following points.

A power supply according to an aspect of the present invention includes a battery; an inverter that controls an output voltage of the battery; an air-cooler that cools the battery and the inverter with cooling air; and a case that houses the battery, the inverter, and the air-cooler.

The power supply may include an air guide plate disposed inside the case. The air-cooler may include a cooling fan and a heat exchanger. The air guide plate may guide air blown from the cooling fan to the battery and the inverter. The heat exchanger may cool the air that has passed through the battery and the inverter.

The air guide plate may guide the air blown from the cooling fan to the battery and then to the inverter.

The air guide plate may guide the air blown from the cooling fan to the inverter and then to the battery.

The air guide plate may have a first portion disposed above the battery. The battery may include a plurality of battery modules disposed side by side in a planar manner. The first portion may have a slit formed to guide the air blown from the cooling fan to a gap between the plurality of battery modules.

The plurality of battery modules may be disposed side by side in a direction orthogonal to a blowing direction of the air from the cooling fan. The slit may be formed so as to extend in the blowing direction.

The air guide plate may have a second portion extending from an edge of the air guide plate close to the cooling fan toward the first portion. The second portion may be inclined so as to have an upward gradient from the edge of the air guide plate close to the cooling fan toward the first portion.

The inverter may be disposed below the second portion.

The air guide plate may have a guide part that guides the air blown from the cooling fan to the slit. The guide part may have a pair of guide plates disposed with the slit therebetween, and extending from an upstream side toward a downstream side in a blowing direction of the air from the cooling fan. A distance between the pair of guide plates may decrease from the upstream side toward the downstream side.

The power supply may include a support part that is erected from an inner bottom portion of the case and that supports the air guide plate at a position above the battery. The battery may have a first side surface disposed on a downstream side in a blowing direction of the air from the cooling fan. The support part may close a gap between the plurality of battery modules, the gap being formed in the first side surface.

The battery may have a second side surface disposed on one side in a direction orthogonal to a direction in which the slit extends, and a third side surface disposed on the other side in the direction orthogonal to the direction in which the slit extends. The battery modules may each include a plurality of cells, and the air guided from the slit to the gap may pass between the plurality of cells to flow in the direction orthogonal to the direction in which the slit extends and may be discharged from the second side surface and the third side surface.

The power supply may include a junction box that houses a relay capable of electrically connecting the battery and the inverter to each other; and a DC-DC converter that boosts the output voltage of the battery. The junction box and the DC-DC converter may be housed in the case.

The above and other elements, features, steps, characteristics and advantages of the present invention will become more apparent from the following detailed description of the preferred embodiments with reference to the attached drawings.

BRIEF DESCRIPTION OF THE DRAWINGS

A more complete appreciation of preferred embodiments of the present invention and many of the attendant advantages thereof will be readily obtained as the same becomes better understood by reference to the following detailed description when considered in connection with the accompanying drawings described below.

DETAILED DESCRIPTION OF THE PREFERRED EMBODIMENTS

Figure 1:
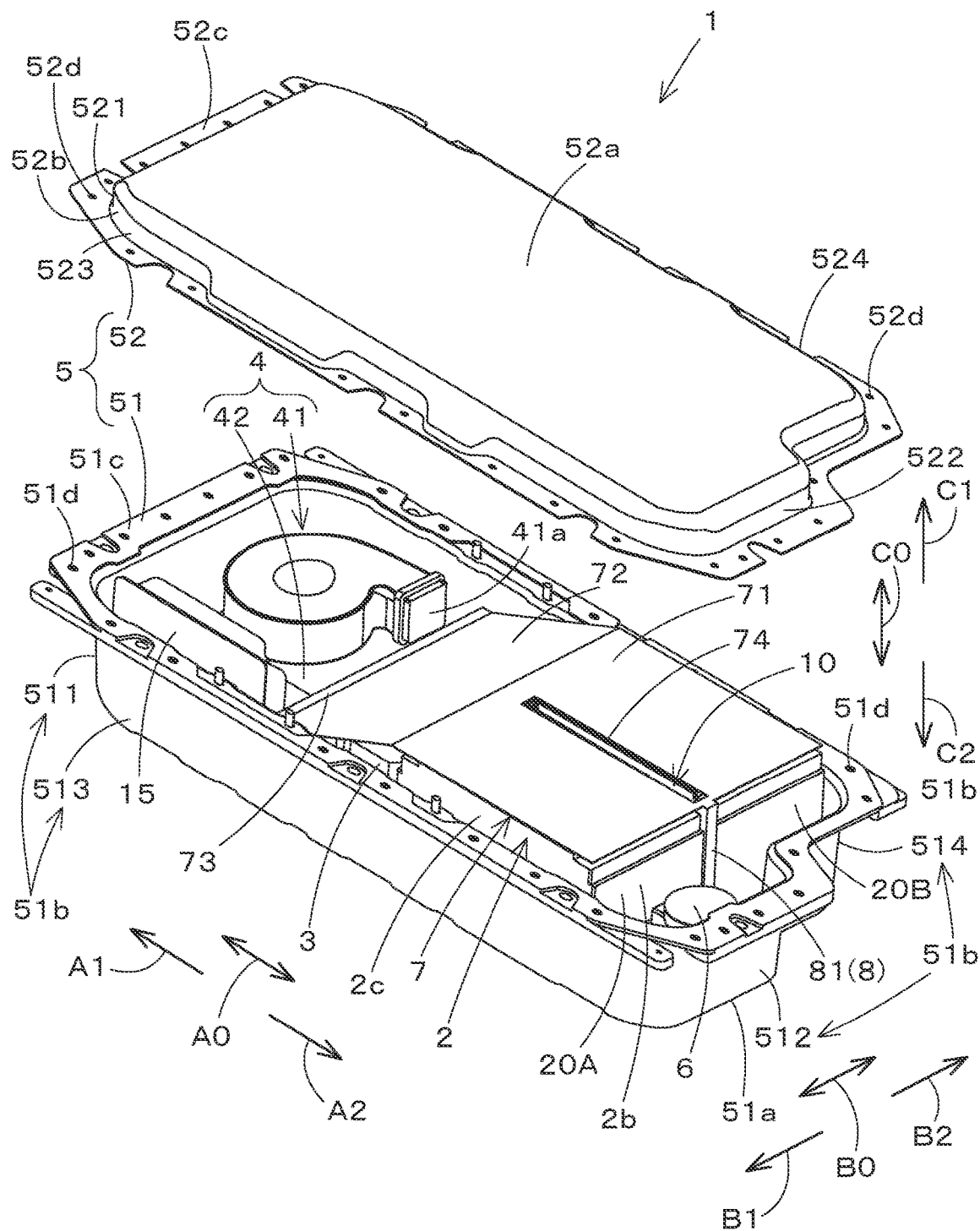
FIG. 1 is an exploded perspective view illustrating a general configuration of a power supply.

The preferred embodiments will now be described with reference to the accompanying drawings, wherein like reference numerals designate corresponding or identical elements throughout the various drawings. The drawings are to be viewed in an orientation in which the reference numerals are viewed correctly.

Hereinafter, a power supply according to an embodiment of the present invention will be described with reference to the drawings.

As illustrated in FIGS. 1 to 4, a power supply 1 includes a battery (secondary battery) 2, a power converter 3, an air-cooler 4, and a case 5. The battery 2, the power converter 3, and the air-cooler 4 are housed in an internal space of the common (one) case 5.

For the orientation of the power supply 1, arrows are illustrated in FIGS. 1 to 4 and other drawings for the convenience of explanation. The direction of an arrow A1 is defined as forward, the direction of an arrow A2 is defined as rearward, the direction of an arrow B1 is defined as leftward, the direction of an arrow B2 is defined as rightward, the direction of an arrow C1 is defined as upward, and the direction of an arrow C2 is defined as downward. The direction of an arrow A0 is referred to as a front-rear direction, the direction of an arrow B0 is referred to as a width direction or a left-right direction, and the direction of an arrow C0 is referred to as an up-down direction. A direction from the left or the right toward the center in the width direction is referred to as inward in the width direction, and a direction from the center in the width direction toward the left or the right is referred to as outward in the width direction.

Figure 5:
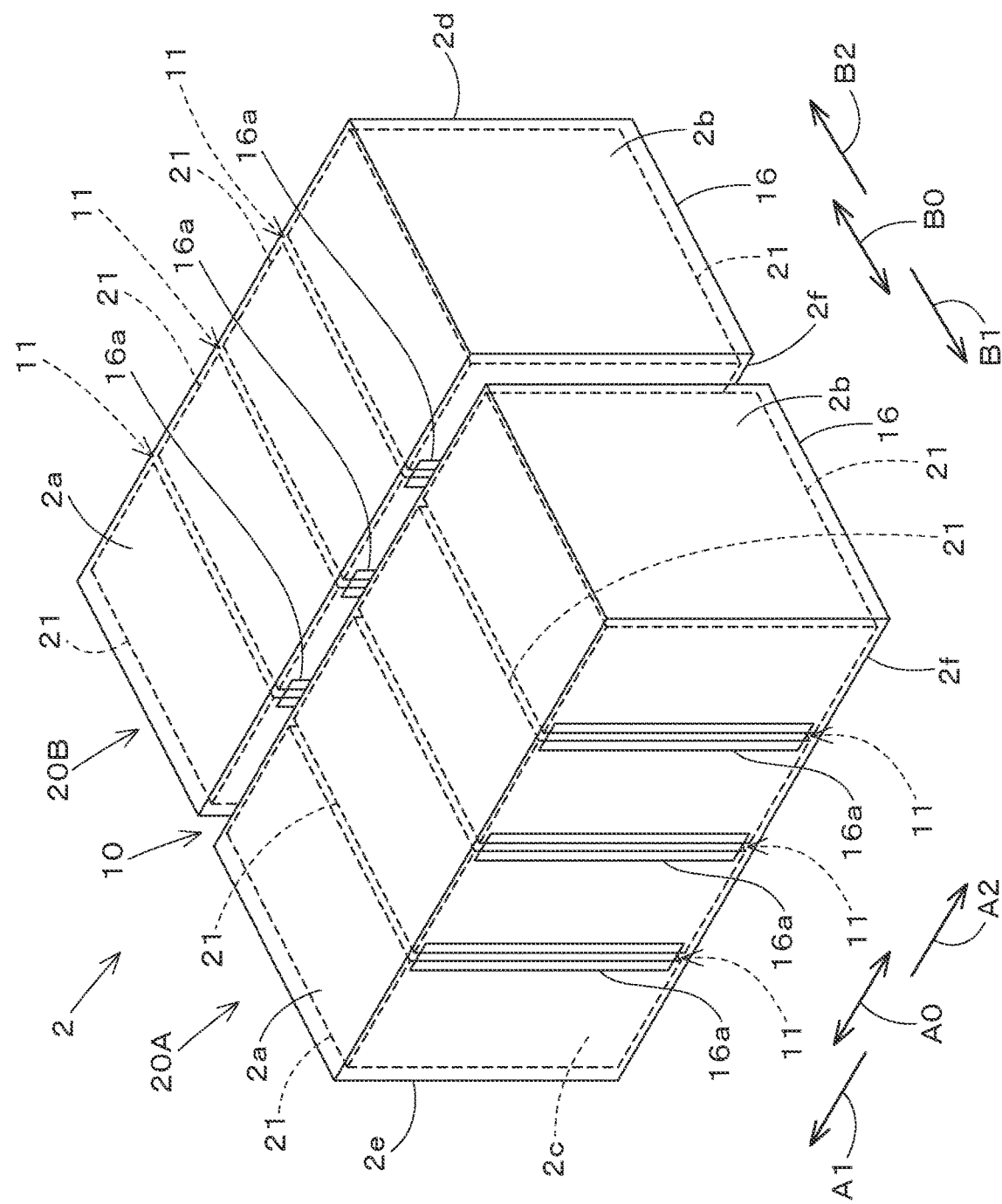
FIG. 5 is a schematic perspective view of a battery.

As illustrated in FIG. 5, the battery 2 includes a plurality of battery modules 20A and 20B. In the present embodiment, the battery 2 includes two battery modules 20A and 20B. However, the number of battery modules included in the battery 2 is not limited to two, and may be three or more, or may be one.

One battery module includes a plurality of battery cells 21. The plurality of battery cells 21 are electrically connected to each other. In FIG. 5, one battery module includes four battery cells 21. However, the number of battery cells 21 included in one battery module is not limited to four, and may be five or more, or three or less. In the following description, a battery cell may be simply referred to as a cell.

Each of the battery cells 21 is, for example, a lithium-ion secondary battery, a nickel-hydrogen secondary battery, or an organic radical battery. In the present embodiment, each of the battery cells 21 and the battery modules 20A and 20B has a rectangular-parallelepiped shape.

The plurality of battery cells 21 included in the battery module 20A are housed in an exterior case 16. The plurality of battery cells 21 included in the battery module 20B are housed in another exterior case 16. In the present embodiment, the exterior cases 16 each have a rectangular parallelepiped shape. Outer surfaces (upper surfaces, lower surfaces, and side surfaces) of the exterior cases 16 define outer surfaces (upper surfaces, lower surfaces, and side surfaces) of the battery modules 20A and 20B. Among the outer surfaces of the battery modules 20A and 20B, surfaces other than surfaces facing each other (surfaces disposed with an inter-module passage 10 therebetween) define outer surfaces of the battery 2.

Figure 2:
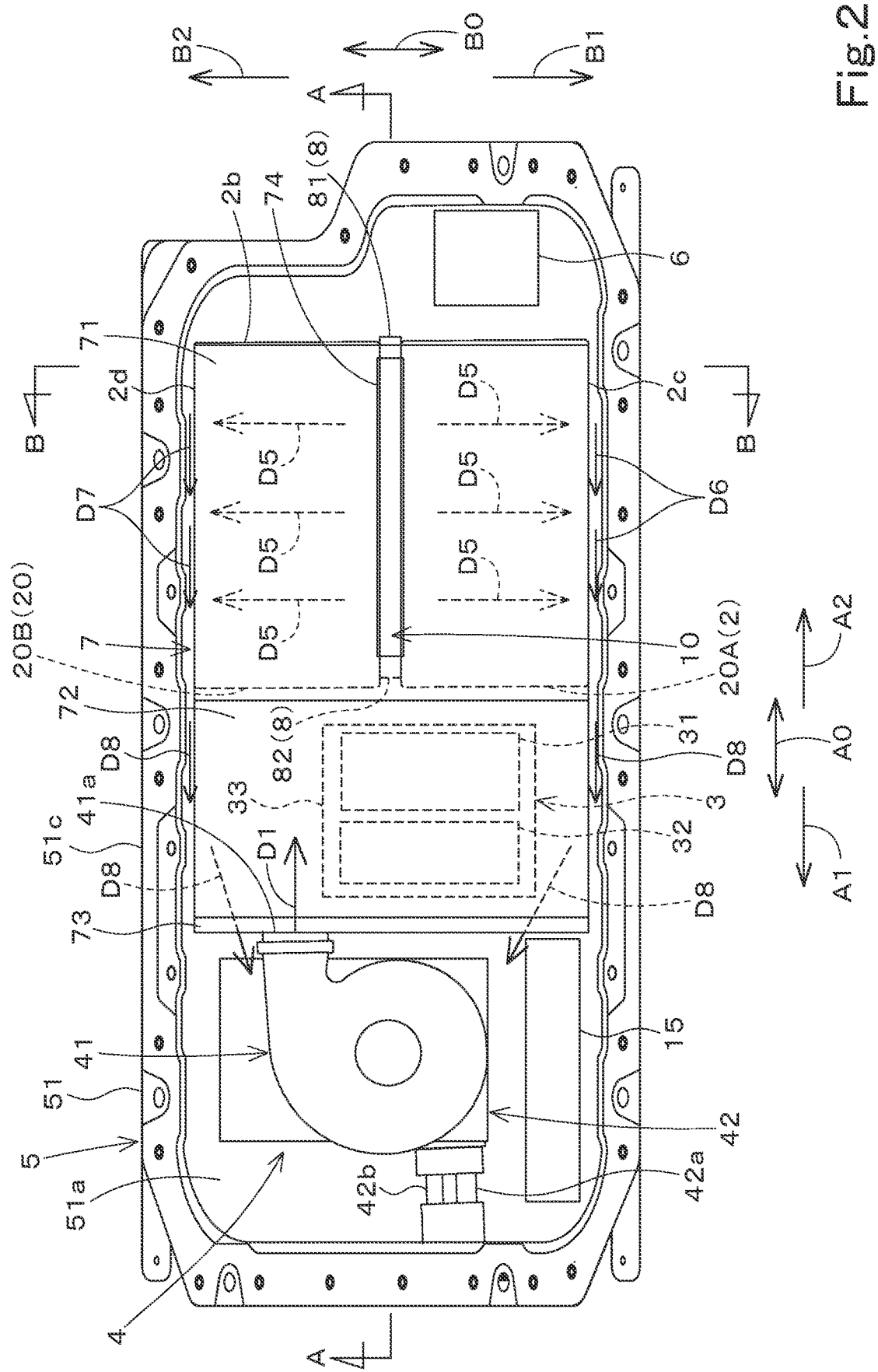
FIG. 2 is a plan view of the power supply with an upper cover removed.

As illustrated in FIGS. 2 and 5, the plurality of battery modules 20A and 20B are disposed in a planar manner. In the present embodiment, the two battery modules 20A and 20B are disposed side by side in the width direction B0. The inter-module passage 10 is formed between the two battery modules 20A and 20B. The inter-module passage 10 extends in the front-rear direction A0.

The plurality of battery cells 21 are disposed side by side in a planar manner. In the present embodiment, the plurality of (four) battery cells 21 are disposed side by side in the front-rear direction A0 in one battery module. Each pair of battery cells 21 adjoining each other have each inter-cell passage 11 therebetween. The inter-cell passages 11 extend in the width direction (left-right direction) B0.

Alternatively, although not illustrated, the battery 2 may have a configuration in which a plurality of battery modules 20A and 20B disposed in a planar manner are stacked in a plurality of stages in the up-down direction. Still alternatively, each of the plurality of battery modules 20A and 20B may have a configuration in which a plurality of battery cells 21 disposed in a planar manner are stacked in a plurality of stages in the up-down direction.

As illustrated in FIG. 5, the battery 2 has a rectangular parallelepiped shape as a whole, and has an upper surface, side surfaces, and a lower surface. Specifically, the battery 2 has an upper surface 2a, a first side surface 2b, a second side surface 2c, a third side surface 2d, a fourth side surface 2e, and a lower surface 2f. The first side surface 2b is disposed to face rearward. The second side surface 2c is disposed to face leftward. The third side surface 2d is disposed to face rightward. The fourth side surface 2e is disposed to face forward.

The upper surface 2a, the first side surface 2b, the fourth side surface 2e, and the lower surface 2f of the battery 2 are divided into two by the inter-module passage 10. In other words, the inter-module passage 10 is continuously open in the upper surface 2a, the first side surface 2b, the fourth side surface 2e, and the lower surface 2f of the battery 2.

The inter-cell passages 11 are open in the second side surface 2c and the third side surface 2d of the battery 2, and also open in portions facing the inter-module passage 10. In other words, inner end portions of the inter-cell passages 11 in the width direction communicate with the inter-module passage 10, and outer end portions thereof in the width direction are open.

As illustrated in FIG. 5, each of the exterior cases 16 is formed with vents 16a at positions facing the respective inter-cell passages 11. The vents 16a are formed in inner surfaces in the width direction and outer surfaces in the width direction of the exterior cases 16. The vents 16a communicate with the respective inter-cell passages 11. The vents 16a formed in the inner surfaces in the width direction of the exterior cases 16 serve as inlets for guiding cooling air (described later) from the outside of the battery 2 (the outside of the exterior cases 16) to the inter-cell passages 11. The vents 16a formed in the outer surfaces in the width direction of the exterior cases 16 serve as outlets for guiding cooling air (described later) from the inter-cell passages 11 to the outside of the battery 2 (the outside of the exterior cases 16).

The power converter 3 is a device that converts electric power (electric energy) output from the battery 2 into electric power in a form suitable for being supplied to a drive device (such as a motor) that is driven by the power supply

Figure 3:
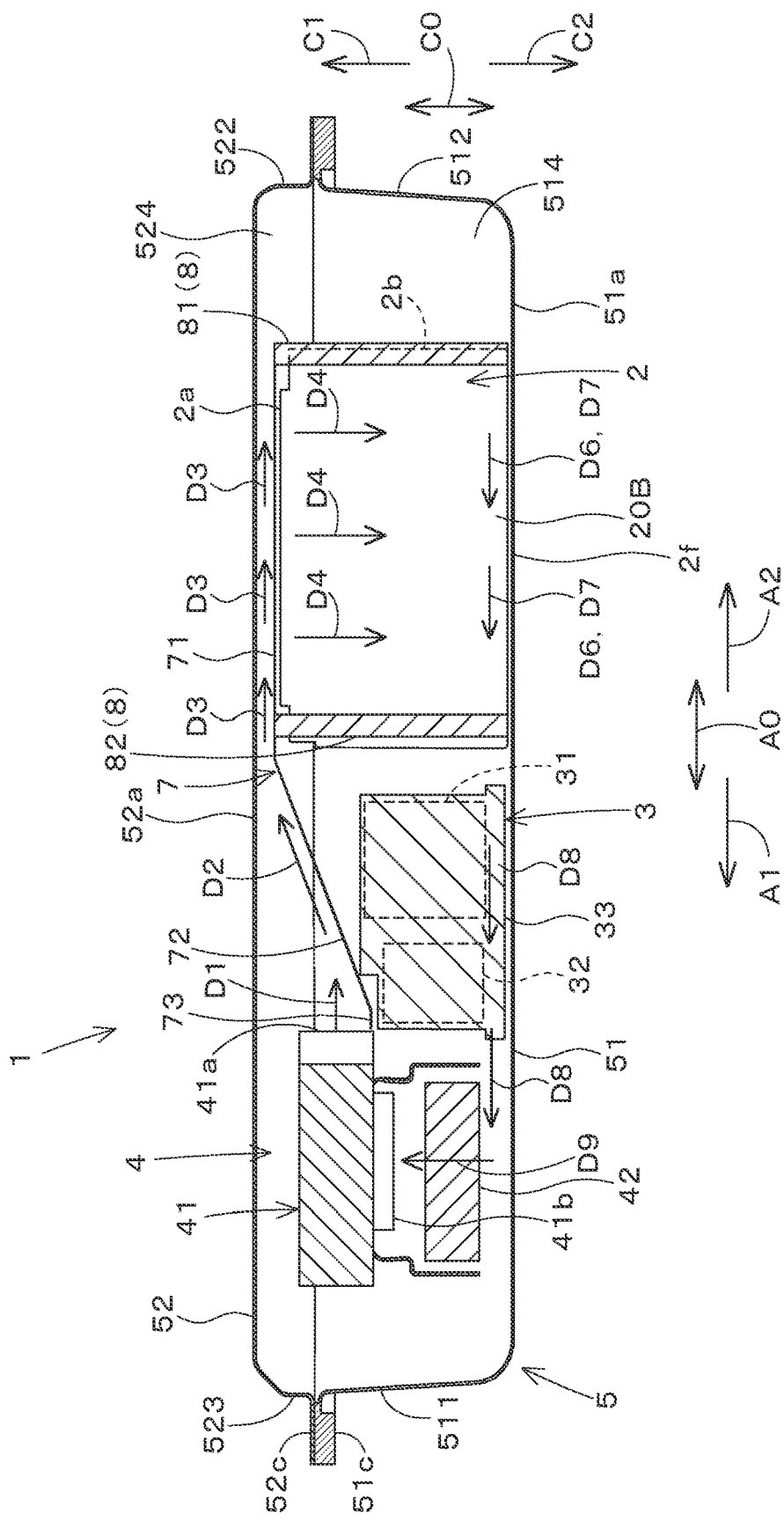
FIG. 3 is a sectional view of the power supply taken along line A-A in FIG. 2.

1. As illustrated in FIGS. 2 and 3, in the present embodiment, the power converter 3 includes an inverter 31 and a DC-DC converter 32. In the illustrated example, the inverter 31 and the DC-DC converter 32 are constituted as an integrated unit. Specifically, the inverter 31 and the DC-DC converter 32 are housed inside a common housing 33.

However, the inverter 31 and the DC-DC converter 32 need not be integrated. In this case, the inverter 31 and the DC-DC converter 32 are disposed side by side at positions close to each other. The inverter 31 and the DC-DC converter 32 may be disposed side by side in the front-rear direction, may be disposed side by side in the width direction, or may be disposed side by side in the up-down direction.

The inverter 31 controls an output voltage of the battery 2. Specifically, the inverter 31 converts a direct-current voltage output from the battery 2 into an alternating-current voltage and outputs the alternating-current voltage. The direct-current voltage output from the battery 2 is supplied to the inverter 31 via the DC-DC converter 32. The DC-DC converter 32 boosts the direct-current voltage output from the battery 2. The inverter 31 converts the direct-current voltage boosted by the DC-DC converter 32 into an alternating-current voltage and outputs the alternating-current voltage. However, the power converter 3 may include at least the inverter 31, and need not include the DC-DC converter 32. When the power converter 3 does not include the DC-DC converter 32, the "power converter 3" in the following description may be read as the "inverter 31".

As illustrated in FIGS. 1 to 3, the air-cooler 4 includes a cooling fan 41 and a heat exchanger 42.

The cooling fan 41 has a blowing portion 41a for blowing air (cooling air) by rotation of a fan, and a suction portion 41b for sucking air toward the fan. In the present embodiment, the cooling fan 41 is a centrifugal fan (sirocco fan). The cooling fan 41 can be driven by using electric power stored in the battery 2.

The heat exchanger 42 cools air flowing through the internal space of the case 5 by heat exchange. The heat exchanger 42 cools the air that has passed through the battery 2 and the power converter 3. In the present embodiment, an evaporator is used as the heat exchanger 42. The heat exchanger 42 includes a pipe through which a refrigerant flows, and a fin for heat radiation provided so as to be thermally conductive with the pipe. Air passing through the heat exchanger 42 is cooled by heat exchange between the refrigerant flowing in the pipe of the heat exchanger 42 and the air passing around the pipe and the fin. An inlet portion 42a and an outlet portion 42b (see FIG. 2) of the pipe of the heat exchanger 42 protrude to the outside of the case 5.

As illustrated in FIGS. 1 and 2, the power supply 1 includes a junction box 6. The junction box 6 houses a relay capable of electrically connecting the battery 2 and the inverter 31 to each other. The junction box 6 is housed inside the case 5.

As illustrated in FIG. 1, the case 5 includes a main body 51 and a cover body 52. In the present embodiment, the case 5 has a substantially rectangular parallelepiped shape, and the length in the front-rear direction A0 is larger than the length in the width direction B0. Moreover, the length (height) in the up-down direction C0 is smaller than the length in the front-rear direction A0 and the length in the width direction B0. However, the shape of the case 5 can be appropriately changed.

The main body 51 has a bottom plate 51a, a side wall 51b, and a first flange 51c. The bottom plate 51a defines a bottom surface of the case 5. The side wall 51b includes a first side wall 511, a second side wall 512, a third side wall 513, and a fourth side wall 514. The first side wall 511 extends upward from a front edge of the bottom plate 51a. The second side wall 512 extends upward from a rear edge of the bottom plate 51a. The third side wall 513 extends upward from a left edge of the bottom plate 51a and connects a left edge of the first side wall 511 and a left edge of the second side wall 512 to each other. The fourth side wall 514 extends upward from a right edge of the bottom plate 51a and connects a right edge of the first side wall 511 and a right edge of the second side wall 512 to each other. The first flange 51c extends outward (in a direction away from the internal space of the case 5) from an upper edge of the side wall 51b.

The cover body 52 has a top plate 52a, a side plate 52b, and a second flange 52c. The top plate 52a defines an upper surface of the case 5. The side plate 52b includes a first side plate 521, a second side plate 522, a third side plate 523, and a fourth side plate 524. The first side plate 521 extends downward from a front edge of the top plate 52a. The second side plate 522 extends downward from a rear edge of the top plate 52a. The third side plate 523 extends downward from a left edge of the top plate 52a and connects a left edge of the first side plate 521 and a left edge of the second side plate 522 to each other. The fourth side plate 524 extends downward from a right edge of the top plate 52a and connects a right edge of the first side plate 521 and a right edge of the second side plate 522 to each other. The second flange 52c extends outward (in the direction away from the internal space of the case 5) from a lower edge of the side plate 52b.

A plurality of first through holes 51d are formed in the first flange 51c. A plurality of second through holes 52d are formed in the second flange 52c. The first flange 51c and the second flange 52c are fixed to each other by superposing the first through holes 51d and the second through holes 52d, inserting bolts, and screwing nuts to the bolts. Thus, the cover body 52 and the main body 51 are fixed to each other. A space surrounded by the cover body 52 and the main body 51 defines the internal space of the case 5. The internal space of the case 5 is a hermetically sealed space into which outside air is not introduced.

As illustrated in FIGS. 1 to 3, the battery 2 is disposed in a rear portion of the internal space of the case 5. The cooling fan 41 is disposed in a front portion of the internal space of the case 5. The blowing portion 41a is disposed to face rearward (to face the battery 2). Thus, the cooling fan 41 can blow air (cooling air) rearward (toward the battery 2) from the blowing portion 41a. Moreover, the blowing portion 41a is disposed at a position shifted outward (rightward) in the width direction from the center in the width direction of the case 5. The suction portion 41b is disposed to face downward. Thus, the cooling fan 41 can suck air from below.

As illustrated in FIG. 3, the position of the battery 2 and the position of the blowing portion 41a of the cooling fan 41 overlap each other in the up-down direction. An upper end (the upper surface 2a) of the battery 2 is disposed at a position higher than the blowing portion 41a of the cooling fan 41. A lower end (the lower surface 2f) of the battery 2 is disposed at a position lower than the blowing portion 41a of the cooling fan 41.

As illustrated in FIG. 3 and other drawings, the heat exchanger 42 is disposed below the cooling fan 41. Specifically, the heat exchanger 42 is disposed below the suction portion 41b of the cooling fan 41. Accordingly, air cooled by passing through the heat exchanger 42 is sucked from the suction portion 41b of the cooling fan 41, and the air is blown from the blowing portion 41a as cooling air.

As illustrated in FIG. 3, the power converter 3 is disposed between the battery 2 and the heat exchanger 42 in the front-rear direction. Thus, the inverter 31 and the DC-DC converter 32 are disposed between the battery 2 and the heat exchanger 42 in the front-rear direction. As illustrated in FIG. 3, an upper end of the power converter 3 is disposed at a position lower than an upper end of the blowing portion 41a of the cooling fan 41. Moreover, the upper end of the power converter 3 is disposed at a position lower than an upper end of the battery 2.

As illustrated in FIGS. 1 and 2, the junction box 6 is disposed in rear of the battery 2. However, the junction box 6 may be disposed at another position. For example, the junction box 6 may be disposed between the power converter 3 and the battery 2. Alternatively, the junction box 6 may be disposed above a second portion 72 of an air guide plate 7.

As illustrated in FIGS. 1 and 2, the power supply 1 includes a battery management unit (BMU) 15. The battery management unit 15 is housed inside the case 5. The battery management unit 15 is a control unit that monitors the state of the battery 2 (the remaining charge amount of the battery 2, the temperature of the battery 2, and so forth). The battery management unit 15 is disposed side by side with the air-cooler 4 (the cooling fan 41 and the heat exchanger 42) in the width direction.

As illustrated in FIGS. 1 to 4, the power supply 1 includes an air guide plate 7. The air guide plate 7 is disposed inside the case 5. The air guide plate 7 is a plate for guiding air (cooling air) blown from the cooling fan 41 in a desirable direction. The air guide plate 7 can guide the air blown from the cooling fan 41 to the battery 2 and the power converter 3.

The air guide plate 7 is made of, for example, a metal plate or a resin plate coated with an insulating material. Thus, it is possible to prevent an electrical short circuit from occurring between the battery 2 and the air guide plate 7.

Figure 6:
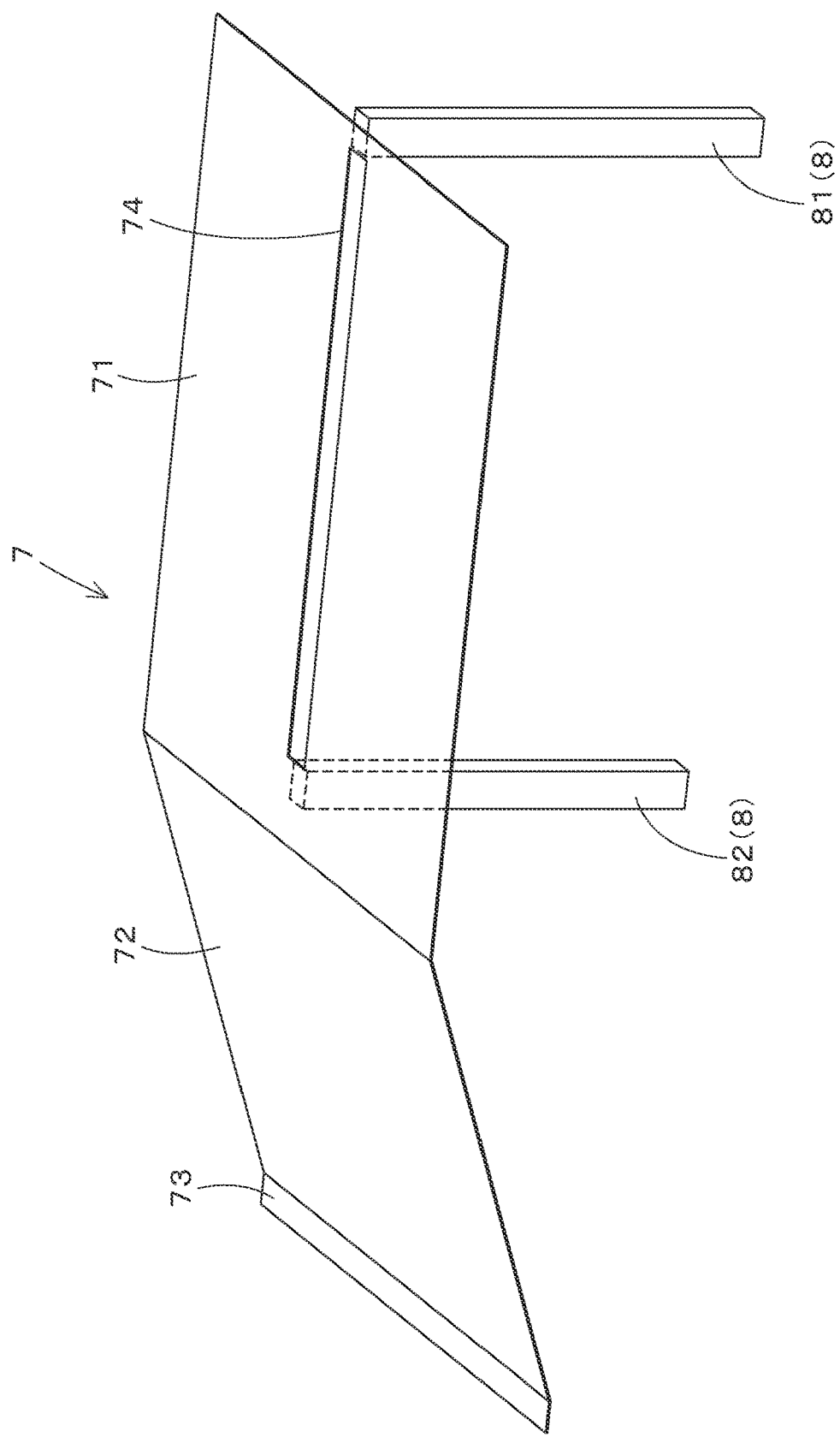
FIG. 6 is a perspective view of an air guide plate.

As illustrated in FIG. 6 and other drawings, the air guide plate 7 has a first portion 71 and a second portion 72.

The first portion 71 is disposed such that one surface faces upward and the other surface faces downward. That is, the first portion 71 is constituted as a flat plate disposed in a horizontal plane. The first portion 71 has a quadrangular (rectangular) shape in plan view. As illustrated in FIGS. 1 to 4, the first portion 71 is disposed above the battery 2. The first portion 71 is disposed so as to cover the upper surface 2a of the battery 2. The first portion 71 is disposed parallel to the upper surface 2a of the battery 2.

A slit 74 is formed in the first portion 71. The slit 74 is a hole whose length in the front-rear direction is larger than the length thereof in the width direction. That is, the slit 74 extends in the front-rear direction. In other words, the slit 74 extends in a blowing direction of the air from the cooling fan 41 (a direction of an arrow D1 in FIGS. 2 and 3). The length of the slit 74 in the front-rear direction is equal to the length of the inter-module passage 10 in the front-rear direction or is smaller than the length of the inter-module passage 10 in the front-rear direction. The width (the length in the width direction B0) of the slit 74 is equal to the width of the inter-module passage 10 or is larger than the width of the inter-module passage 10.

The first side surface 2b of the battery 2 is disposed on one side (rear side) in a direction (front-rear direction) in which the slit 74 extends. In other words, the first side surface 2b is disposed on a downstream side in the blowing direction D1 of the air from the cooling fan 41. The fourth side surface 2e is disposed on the other side (front side) in the direction (front-rear direction) in which the slit 74 extends. In other words, the fourth side surface 2e is disposed on an upstream side in the blowing direction D1 of the air from the cooling fan 41. The second side surface 2c is disposed on one side (left side) in a direction (width direction) orthogonal to the direction in which the slit 74 extends. The third side surface 2d is disposed on the other side (right side) in the direction (width direction) orthogonal to the direction in which the slit 74 extends.

As illustrated in FIG. 2, the slit 74 is disposed at a position at which the slit 74 overlaps a gap (the inter-module passage 10) between the plurality of battery modules 20A and 20B in plan view. Thus, the slit 74 can guide the air (cooling air) blown from the cooling fan 41 to the gap (the inter-module passage 10) between the plurality of battery modules 20A and 20B.

As illustrated in FIGS. 1, 3 and 6, the second portion 72 extends obliquely forward and downward from a front edge of the first portion 71. As illustrated in FIGS. 1 and 3, the second portion 72 is inclined so as to have an upward gradient from an edge of the second portion 72 close to the cooling fan 41 (front) toward an edge of the second portion 72 close to the first portion 71 (rear) inside the case 5. A third portion 73 extending forward in the horizontal direction is provided in a front portion of the second portion 72. The first portion 71, the second portion 72, and the third portion 73 are integrally formed.

As illustrated in FIG. 3, the air (cooling air) blown from the blowing portion 41a of the cooling fan 41 flows along an upper surface of the second portion 72 of the air guide plate 7 (see an arrow D2), reaches a gap above the first portion 71 disposed above the battery 2, and flows rearward along an upper surface of the first portion 71 (see an arrow D3).

As illustrated in FIG. 3, the distance between the upper surface of the first portion 71 and an inner upper surface of the case 5 (a lower surface of the top plate 52a) is smaller than the distance between the upper surface of the second portion 72 and the inner upper surface of the case 5. Hence, when the cooling air is guided from the gap above the second portion 72 to the gap above the first portion 71, the air velocity increases. Hence, the cooling air can be reliably guided to a rear portion of the second portion 72. Moreover, since the sectional area (air passage sectional area) orthogonal to the flow direction of the cooling air decreases in the gap above the first portion 71, the pressure of the cooling air increases, and thus the cooling air is more likely to be guided to the slit 74.

As illustrated in FIGS. 1 to 3, the power converter 3 is disposed below the second portion 72. When the power converter 3 includes the inverter 31 and the DC-DC converter 32, the inverter 31 and the DC-DC converter 32 are disposed below the second portion 72. When the power converter 3 includes the inverter 31 but does not include the DC-DC converter 32, the inverter 31 is disposed below the second portion 72, but the DC-DC converter 32 is not disposed.

As illustrated in FIG. 3 and other drawings, a front portion (the third portion 73) of the air guide plate 7 is disposed in contact with or close to a lower portion of the blowing portion 41a of the cooling fan 41. A rear portion (the first portion 71) of the air guide plate 7 is disposed at a position higher than the blowing portion 41a. An intermediate portion (the second portion 72) in the front-rear direction of the air guide plate 7 is disposed in a manner inclined with an upward gradient so as to extend from the lower portion of the blowing portion 41a to the position higher than the blowing portion 41a.

As illustrated in FIGS. 1 to 4, the power supply 1 includes a support part 8 that supports the air guide plate 7. As illustrated in FIG. 6 and other drawings, the support part 8 includes a first support portion 81 provided at a rear portion of the first portion 71 and a second support portion 82 provided at a front portion of the first portion 71. The first support portion 81 is disposed in rear of the slit 74. The second support portion 82 is disposed in front of the slit 74. The widths of the first support portion 81 and the second support portion 82 each are equal to the width of the slit 74 or each are smaller than the width of the slit 74. The first support portion 81 and the second support portion 82 extend downward from the first portion 71. The lengths (heights) of the first support portion 81 and the second support portion 82 are set to be equal to the height of the battery 2 or are set to be larger than the height of the battery 2.

A lower end of the support part 8 is fixed to an inner bottom portion (an upper surface of the bottom plate 51a) of the case 5. That is, the support part 8 is erected upward from the inner bottom portion (the upper surface of the bottom plate 51a) of the case 5. Since the lower end of the support part 8 is fixed to the case 5, the air guide plate 7 is fixed to the case 5. However, the method of fixing the air guide plate 7 to the case 5 may be another method such as fixing the air guide plate 7 to the first flange 51c or the second flange 52c. When the other method is employed, the lower end of the support part 8 may be separated from the inner bottom portion (the upper surface of the bottom plate 51a) of the case 5.

Figure 4:
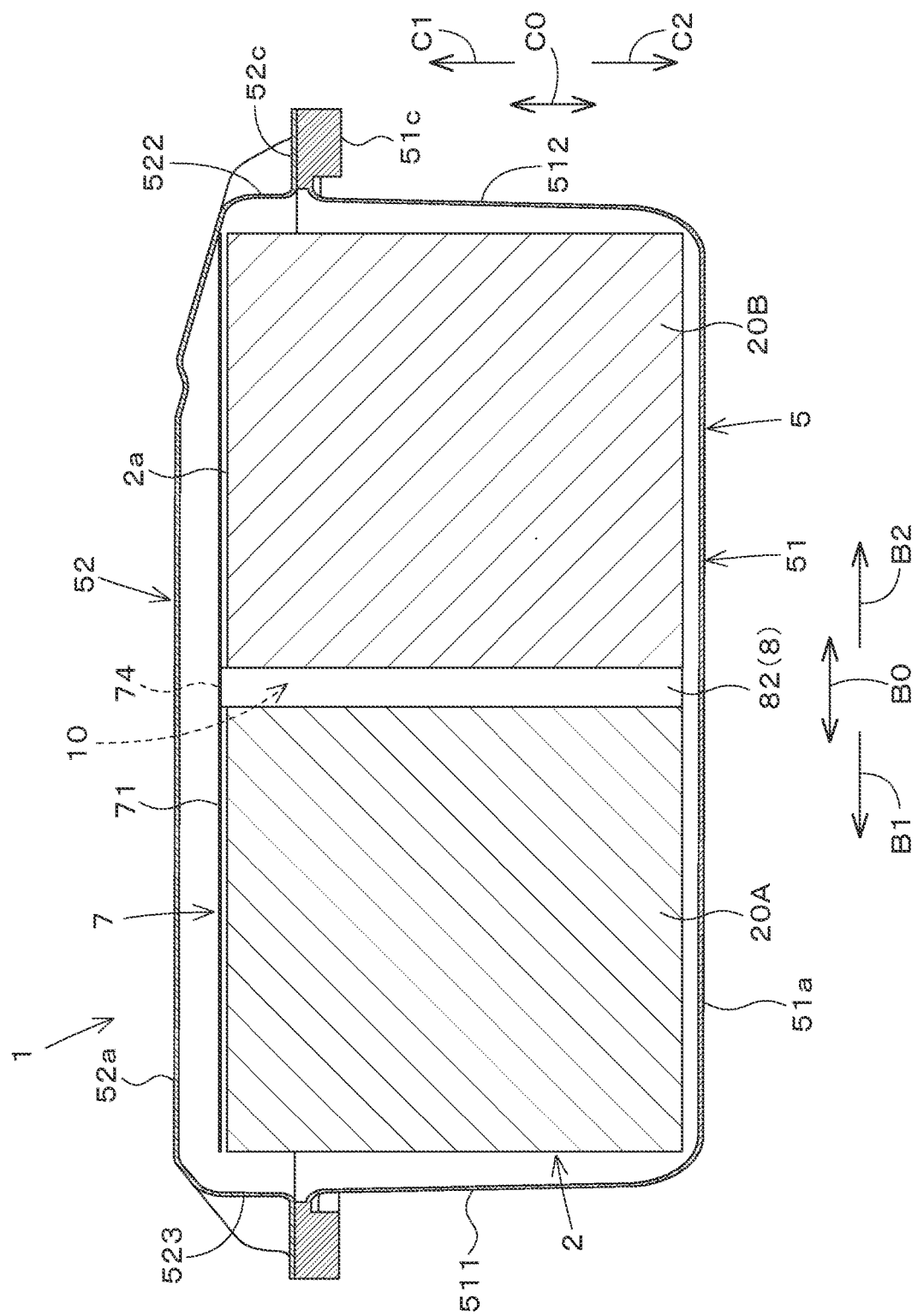
FIG. 4 is a sectional view of the power supply taken along line B-B in FIG. 2.

As illustrated in FIGS. 1 to 3, the first support portion 81 is disposed at a position close to the first side surface 2b of the battery 2. As illustrated in FIGS. 1 and 2, the first support portion 81 closes a gap between the plurality of battery modules 20A and 20B, the gap being formed in the first side surface 2b of the battery 2. The second support portion 82 is disposed at a position close to the fourth side surface 2e of the battery 2. As illustrated in FIGS. 2 and 4, the second support portion 82 closes a gap between the plurality of battery modules 20A and 20B, the gap being formed in the fourth side surface 2e of the battery 2. Hence, a front portion and a rear portion of the gap between the plurality of battery modules 20A and 20B are closed with the support part 8. In other words, a front portion and a rear portion of the inter-module passage 10 are closed with the support part 8. Thus, air (cooling air) is prevented from flowing into the inter-module passage 10 from the front and the rear of the inter-module passage 10. As a result, the air (cooling air) can intensively flow into the inter-module passage 10 from above (from the slit 74).

In the present embodiment, the support part 8 has a columnar shape; however, the support part 8 may have a plate shape. When the support part 8 has a plate shape, the plate-shaped first support portion 81 is disposed to cover the first side surface 2b of the battery 2, and the plate-shaped second support portion 82 is disposed to cover the fourth side surface 2e of the battery 2. This configuration can also prevent air from flowing into the inter-module passage 10 from the front and the rear of the inter-module passage 10.

Figure 7:
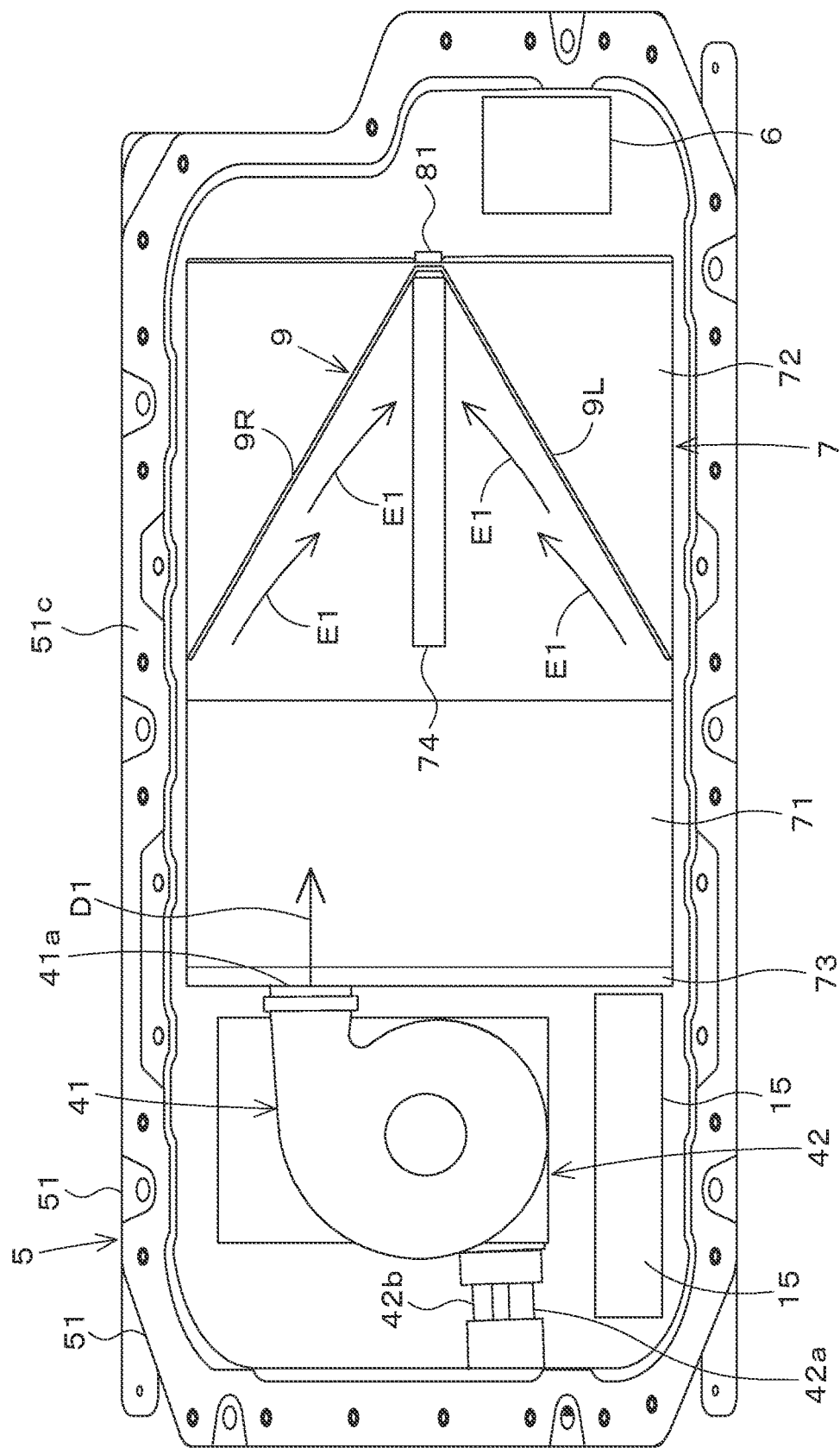
FIG. 7 is a plan view of the power supply with the upper cover removed, the power supply having a configuration in which a guide part is provided on the air guide plate.

As illustrated in FIG. 7, the power supply 1 may have a configuration in which a guide part 9 is provided on an upper surface of the air guide plate 7. The guide part 9 is provided to guide the air blown from the cooling fan 41 to the slit 74. The guide part 9 has a pair of guide plates 9L and 9R disposed with the slit 74 therebetween. The guide plate 9L is disposed at the left of the slit 74. The guide plate 9R is disposed at the right of the slit 74.

The pair of guide plates 9L and 9R are erected upward from the upper surface of the air guide plate 7. The pair of guide plates 9L and 9R extend from the upstream side to the downstream side in the blowing direction D1 (from the front to the rear) of the cooling fan 41. Front end portions of the pair of guide plates 9L and 9R are disposed in front of a front end portion of the slit 74. Rear end portions of the pair of guide plates 9L and 9R are disposed in rear of a rear end portion of the slit 74. The distance between the pair of guide plates 9L and 9R (the distance between the guide plate 9L and the guide plate 9R) decreases from the upstream side toward the downstream side in the blowing direction D1 of the cooling fan 41. The rear end portion of the guide plate 9L and the rear end portion of the guide plate 9R are connected to each other in rear of the slit 74.

As illustrated in FIG. 7, in the present embodiment, the pair of guide plates 9L and 9R are disposed in a V-shape in plan view. In the pair of guide plates 9L and 9R, an open section of the V-shape is disposed on the upstream side in the blowing direction D1, and a closed section of the V-shape is disposed on the downstream side in the blowing direction D1.

By providing the guide part 9 on the air guide plate 7, the air (cooling air) blown from the cooling fan 41 can be collected toward the slit 74 by the guide part 9 (see an arrow E1). Moreover, the air blown from the cooling fan 41 can be prevented from flowing over the slit 74 to the rear of the battery 2. Thus, the air (cooling air) blown from the cooling fan 41 can be efficiently guided to the slit 74.

Hereinafter, a flow of air (cooling air) inside the case 5 of the power supply 1 will be described in detail.

As illustrated in FIGS. 2 and 3, air (cooling air) blown from the blowing portion 41a of the cooling fan 41 flows from the front to the rear in the internal space of the case 5 (see the arrow D1). The blown air flows along the upper surface of the air guide plate 7 (see the arrows D2 and D3). Specifically, the air flows sequentially along the upper surface of the third portion 73 and the upper surface of the second portion 72, and reaches the gap above the first portion 71. In this case, since the second portion 72 of the air guide plate 7 is gently inclined toward the first portion 71, it is possible to reduce a pressure loss that may occur when the air flows from the gap above the second portion 72 toward the gap above the first portion 71.

The air that has reached the gap above the first portion 71 flows along the upper surface of the first portion 71, and is guided from the slit 74 provided in the first portion 71 to the gap (the inter-module passage 10) between the plurality of battery modules 20A and 20B (see an arrow D4). The air guided to the gap between the plurality of battery modules 20A and 20B passes between the plurality of cells (the inter-cell passages 11) included in the battery modules 20A and 20B, flows in a direction orthogonal to the slit 74 (see an arrow D5), and is discharged from the second side surface 2c and the third side surface 2d of the battery 2. Thus, the plurality of battery cells 21 included in the plurality of battery modules 20A and 20B are efficiently cooled with the cooling air.

The air discharged from the second side surface 2c of the battery 2 flows forward through a gap between the second side surface 2c and an inner surface of the case 5 (inner surfaces of the third side wall 513 and the third side plate 523) (see an arrow D6). The air discharged from the third side surface 2d of the battery 2 flows forward through a gap between the third side surface 2d and an inner surface of the case 5 (inner surfaces of the fourth side wall 514 and the fourth side plate 524) (see an arrow D7). The air flowing forward further flows forward while cooling the power converter 3 by passing around the power converter 3 (see an arrow D8).

Since the second portion 72 of the air guide plate 7 is inclined downward from the rear toward the front, the air (cooling air) flowing forward is prevented from rising and is collected downward toward the front. Thus, the cooling air can reliably flow around the power converter 3, and the power converter 3 can be efficiently cooled.

The air that has passed around the power converter 3 is cooled by passing through the heat exchanger 42 (see an arrow D9), and the cooled air is sucked from the suction portion 41b into the cooling fan 41 and then is blown from the blowing portion 41a (see the arrow D1). Thus, the air (cooling air) blown from the blowing portion 41a cools the battery 2 and the power converter 3 (the inverter 31 and the DC-DC converter 32) while circulating inside the case 5.

As described above, the air guide plate 7 guides the air blown from the cooling fan 41 to the battery 2 and then to the inverter 31 (the power converter 3). In general, the heat-resistant temperature of the battery 2 is lower than the heat-resistant temperature of the inverter 31. For example, the heat-resistant temperature of the battery 2 is about 60° C., and the heat-resistant temperature of the inverter 31 is about 80° C. Thus, the battery 2 having the low heat-resistant temperature can be cooled more preferentially than the inverter 31 having the high heat-resistant temperature by first applying the air, which is immediately after being blown from the cooling fan 41 and which is not warmed yet (at low temperature), to the battery 2.

However, the air guide plate 7 may be configured to guide the air blown from the cooling fan 41 to the inverter 31 (the power converter 3) and then to the battery 2. This configuration can be obtained by, for example, interchanging the positions of the power converter 3 (the inverter 31 and the DC-DC converter 32) and the battery 2. This configuration can also be obtained by disposing the power converter 3 (the inverter 31 and the DC-DC converter 32) above the second portion 72 of the air guide plate 7 without changing the disposition of the battery 2. This configuration is suitably employed when the heat-resistant temperature of the inverter 31 is lower than the heat-resistant temperature of the battery 2.

In the above-described embodiment, the battery 2 includes the battery modules 20A and 20B. However, the battery 2 may include only the plurality of battery cells 21 without including the battery module. In this case, the battery cells 21 are disposed side by side in the front-rear direction and the width direction. Thus, the inter-cell passages 11 include an inter-cell passage extending in the front-rear direction and an inter-cell passage extending in the width direction. The inter-cell passage extending in the front-rear direction is disposed below the slit 74.

The power supply 1 can be used as, for example, a device for supplying electric power to a motor (including a motor/generator) for driving an agricultural machine, a construction machine, a utility vehicle, a mower, or the like. Specifically, the power supply 1 can be suitably used as a device that is mounted on an electric vehicle driven by using an electric motor or a hybrid vehicle driven by using both an electric motor and an engine to supply electric power to the electric motor. Specifically, the power supply 1 can be used by being mounted on a working vehicle such as a tractor, a compact track loader, or a skid-steer loader.

With the power supply 1 according to the above-described embodiment, the following advantageous effects are attained.

A power supply 1 includes a battery 2; an inverter 31 that controls an output voltage of the battery 2; an air-cooler 4 that cools the battery 2 and the inverter 31 with cooling air; and a case 5 that houses the battery 2, the inverter 31, and the air-cooler 4.

With this configuration, since the battery 2, the inverter 31, and the air-cooler 4 are housed in the common case 5, the battery 2 and the inverter 31 can be efficiently cooled with the cooling air from the air-cooler 4. Moreover, since the battery 2 and the inverter 31 can be cooled by the common air-cooler 4, the power supply 1 can be reduced in size. Thus, the power supply 1 can be installed even in a limited narrow space. Furthermore, since connectors, harnesses, and refrigerant pipes are not required unlike in a case where a plurality of coolers are provided, it is possible to reduce the number of components and hence reduce manufacturing cost. Furthermore, by housing the battery 2, the inverter 31, and the air-cooler 4 in the common (one) case 5, it is possible to secure high waterproof performance and dust-proof performance. Thus, an expensive waterproof case or dustproof case is not required.

The power supply 1 includes an air guide plate 7 disposed inside the case 5, the air-cooler 4 includes a cooling fan 41 and a heat exchanger 42, the air guide plate 7 guides air blown from the cooling fan 41 to the battery 2 and the inverter 31, and the heat exchanger 42 cools the air that has passed through the battery 2 and the inverter 31.

With this configuration, the air blown from the cooling fan 41 can be guided to the battery 2 and the inverter 31 by the air guide plate 7 to cool the battery 2 and the inverter 31, and warmed air after cooling the battery 2 and the inverter 31 can be cooled by the heat exchanger 42. Hence, the battery 2 and the inverter 31 can always be cooled with the cooling air having a low temperature, and a temperature rise of the battery 2 and the inverter 31 can be suppressed for a long time. Thus, the power supply 1 can maintain a high output for a long time.

The air guide plate 7 guides the air blown from the cooling fan 41 to the battery 2 and then to the inverter 31.

With this configuration, in a case where the heat-resistant temperature of the battery 2 is lower than the heat-resistant temperature of the inverter 31, the air blown from the cooling fan 41 in a low-temperature state in which the air is not warmed yet can be brought into contact with the battery 2. Thus, the battery 2 having the low heat-resistant temperature can be efficiently cooled preferentially to the inverter 31 having the high heat-resistant temperature.

The air guide plate 7 guides the air blown from the cooling fan 41 to the inverter 31 and then to the battery 2.

With this configuration, in a case where the heat-resistant temperature of the inverter 31 is lower than the heat-resistant temperature of the battery 2, the air blown from the cooling fan 41 in a low-temperature state in which the air is not warmed yet can be brought into contact with the inverter 31. Thus, the inverter 31 having the low heat-resistant temperature can be efficiently cooled preferentially to the battery 2 having the high heat-resistant temperature.

The air guide plate 7 has a first portion 71 disposed above the battery 2, the battery 2 includes a plurality of battery modules 20A and 20B disposed side by side in a planar manner, and the first portion 71 has a slit 74 formed to guide the air blown from the cooling fan 41 to a gap between the plurality of battery modules 20A and 20B.

With this configuration, by guiding the air blown from the cooling fan 41 to the gap between the plurality of battery modules 20A and 20B through the slit 74, the plurality of battery modules 20A and 20B can be efficiently cooled.

The plurality of battery modules 20A and 20B are disposed side by side in a direction orthogonal to a blowing direction D1 of the air from the cooling fan 41, and the slit 74 is formed so as to extend in the blowing direction D1.

With this configuration, since the cooling air having the same temperature can be brought into contact with the plurality of battery modules 20A and 20B, the plurality of battery modules 20A and 20B can be uniformly and efficiently cooled. Moreover, the air blown from the cooling fan 41 can be introduced into the slit 74 in a long distance range extending in the blowing direction D1.

The air guide plate 7 has a second portion 72 extending from an edge of the air guide plate 7 close to the cooling fan 41 toward the first portion 71, and the second portion 72 is inclined so as to have an upward gradient from the edge of the air guide plate 7 close to the cooling fan 41 toward the first portion 71.

With this configuration, since the cooling air blown from the cooling fan 41 can be smoothly guided to the first portion 71 along the inclination of the air guide plate 7, a pressure loss of the cooling air can be reduced.

The inverter 31 is disposed below the second portion 72.

With this configuration, a rise of the cooling air can be suppressed by the second portion 72, and a flow of the cooling air can be concentrated in the vicinity of the inverter 31 (below the second portion 72). Thus, the inverter 31 can be efficiently cooled.

The air guide plate 7 has a guide part 9 that guides the air blown from the cooling fan 41 to the slit 74; the guide part 9 has a pair of guide plates 9L and 9R disposed with the slit 74 therebetween, and extending from an upstream side toward a downstream side in a blowing direction D1 of the air from the cooling fan 41; and a distance between the pair of guide plates 9L and 9R decreases from the upstream side toward the downstream side in the blowing direction D1 of the air.

With this configuration, the air blown from the cooling fan 41 can be efficiently and reliably guided to the slit 74 by the pair of guide plates 9L and 9R.

The power supply 1 includes a support part 8 that is erected from an inner bottom portion of the case 5 and that supports the air guide plate 7 at a position above the battery 2; the battery 2 has a first side surface 2b disposed on a downstream side in a blowing direction D1 of the air from the cooling fan 41; and the support part 8 closes a gap between the plurality of battery modules 20A and 20B, the gap being formed in the first side surface 2b.

With this configuration, the support part 8 can prevent the cooling air from entering from the gap between the plurality of battery modules 20A and 20B formed in the first side surface 2b. Thus, the cooling air can be guided in a concentrated manner toward the slit 74. Accordingly, since the cooling air is intensively introduced into the gap between the battery modules 20A and 20B from above, the cooling efficiency of the battery modules 20A and 20B can be improved.

The battery 2 has a second side surface 2c disposed on one side in a direction orthogonal to a direction in which the slit 74 extends, and a third side surface 2d disposed on the other side in the direction orthogonal to the direction in which the slit 74 extends; and the battery modules 20A and 20B each include a plurality of cells 21, and the air guided from the slit 74 to the gap passes between the plurality of cells 21 to flow in the direction orthogonal to the direction in which the slit 74 extends and is discharged from the second side surface 2c and the third side surface 2d.

With this configuration, since the cooling air introduced from the gap between the plurality of battery modules 20A and 20B can be discharged through the gap between the plurality of cells 21, the plurality of cells 21 can be efficiently and reliably cooled.

The power supply 1 includes a junction box 6 that houses a relay capable of electrically connecting the battery 2 and the inverter 31 to each other; and a DC-DC converter 32 that boosts the output voltage of the battery 2. The junction box 6 and the DC-DC converter 32 are housed in the case 5.

With this configuration, since the DC-DC converter 32 is housed in the case 5, the DC-DC converter 32 can be cooled together with the battery 2 and the inverter 31 by the air-cooler 4. Thus, it is not necessary to provide another cooler for cooling the DC-DC converter 32, and it is possible to efficiently cool the DC-DC converter 32, the battery 2, and the inverter 31 by the one air-cooler 4. Moreover, since the junction box 6 is housed in the case 5, the battery 2 and the inverter 31 can be connected to each other by the relay housed in the junction box 6 inside the case 5.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. A power supply comprising:
    a battery;
    an inverter that controls an output voltage of the battery;
    an air-cooler that cools the battery and the inverter with cooling air;
    a case that houses the battery, the inverter, and the air-cooler;
    an air guide plate disposed inside the case; and
    a support part that is erected from an inner bottom portion of the case and that supports the air guide plate at a position above the battery,
    wherein the air-cooler includes a cooling fan and a heat exchanger,
    wherein the air guide plate guides air blown from the cooling fan to the battery and the inverter,
    wherein the heat exchanger cools the air that has passed through the battery and the inverter,
    wherein the air guide plate has a first portion disposed above the battery so as to cover an upper surface of the battery,
    wherein the battery includes a plurality of battery modules disposed side by side in a planar manner,
    wherein the first portion has a slit formed to guide the air blown from the cooling fan to a gap between the plurality of battery modules,
    wherein the battery has a first side surface disposed on a downstream side in a blowing direction of the air from the cooling fan,
    wherein the support part closes a gap between the plurality of battery modules, the gap being formed in the first side surface,
    wherein the support part includes a first support portion disposed in rear of the slit and a second support portion disposed in front of the slit, and
    wherein the first support portion and the second support portion extend downward from the first portion.

2. The power supply according to claim 1, wherein the air guide plate guides the air blown from the cooling fan to the battery and then to the inverter.

3. The power supply according to claim 1, wherein the air guide plate guides the air blown from the cooling fan to the inverter and then to the battery.

4. The power supply according to claim 1,
wherein the plurality of battery modules are disposed side by side in a direction orthogonal to a blowing direction of the air from the cooling fan, and
wherein the slit is formed so as to extend in the blowing direction.

5. The power supply according to claim 1,
wherein the air guide plate has a second portion extending from an edge of the air guide plate close to the cooling fan toward the first portion, and
wherein the second portion is inclined so as to have an upward gradient from the edge of the air guide plate close to the cooling fan toward the first portion.

6. The power supply according to claim 5, wherein the inverter is disposed below the second portion.

7. The power supply according to claim 1,
wherein the air guide plate has a guide part that guides the air blown from the cooling fan to the slit,
wherein the guide part has a pair of guide plates disposed with the slit therebetween, and extending from an upstream side toward the downstream side in the blowing direction of the air from the cooling fan, and
wherein a distance between the pair of guide plates decreases from the upstream side toward the downstream side.

8. The power supply according to claim 1,
wherein the battery has a second side surface disposed on one side in a direction orthogonal to a direction in which the slit extends, and a third side surface disposed on the other side in the direction orthogonal to the direction in which the slit extends, and
wherein the battery modules each include a plurality of cells, and the air guided from the slit to the gap passes between the plurality of cells to flow in the direction orthogonal to the direction in which the slit extends and is discharged from the second side surface and the third side surface.

9. The power supply according to claim 1, comprising:
a junction box that houses a relay capable of electrically connecting the battery and the inverter to each other; and
a DC-DC converter that boosts the output voltage of the battery,
wherein the junction box and the DC-DC converter are housed in the case.

10. The power supply according to claim 1,
wherein the slit is a hole provided in the first portion,
wherein the slit is disposed at a position at which the slit overlaps an inter-module passage between the plurality of battery modules in plan view, and
wherein the air blown from the cooling fan flows downward from the slit and is guided to the gap between the plurality of battery modules.

11. The power supply according to claim 1, comprising:
a battery management unit housed inside the case to monitor a state of the battery,
wherein the heat exchanger is an evaporator, and
wherein the battery management unit is disposed side by side with the cooling fan and the evaporator.

* * * * *